US009081387B2

(12) United States Patent
Bretzigheimer et al.

(10) Patent No.: US 9,081,387 B2
(45) Date of Patent: Jul. 14, 2015

(54) METHOD AND DEVICE FOR THE PREDICTION AND ADAPTATION OF MOVEMENT TRAJECTORIES OF MOTOR VEHICLES

(75) Inventors: Kai Bretzigheimer, Mainz (DE); Daniel Foerster, Darmstadt (DE); Andreas Hartmann, Assmannshardt (DE); Bernd Hartmann, Bad Homburg (DE); Thorsten Staab, Waldaschaff (DE); Ulrich Staehlin, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 10 days.

(21) Appl. No.: 14/002,441

(22) PCT Filed: Mar. 1, 2012

(86) PCT No.: PCT/EP2012/053492
§ 371 (c)(1),
(2), (4) Date: Oct. 23, 2013

(87) PCT Pub. No.: WO2012/117044
PCT Pub. Date: Sep. 7, 2012

(65) Prior Publication Data
US 2014/0074388 A1 Mar. 13, 2014

(30) Foreign Application Priority Data

Mar. 1, 2011 (DE) .......................... 10 2011 004 877
Mar. 1, 2011 (DE) .......................... 10 2011 004 880
Mar. 4, 2011 (DE) .......................... 10 2011 005 098

(51) Int. Cl.
*G06F 19/00* (2011.01)
*G05D 1/02* (2006.01)
(Continued)

(52) U.S. Cl.
CPC .............. *G05D 1/0289* (2013.01); *B60T 1/10* (2013.01); *B60T 8/17558* (2013.01);
(Continued)

(58) Field of Classification Search
CPC ...... B60T 8/17558; B60T 1/10; B60W 10/20; B60W 30/09; B60W 2550/12; B60W 2550/148; B60W 30/0953; B62D 6/006; B62D 15/0265; G08G 1/16; G08G 1/165; G05D 1/0289
USPC ................................ 701/41, 48, 58, 117, 301
See application file for complete search history.

(56) References Cited

U.S. PATENT DOCUMENTS 5,694,321 A 12/1997 Eckert et al.
5,711,023 A 1/1998 Eckert et al.
(Continued)

FOREIGN PATENT DOCUMENTS

DE 100 12 737 9/2001
DE 100 60 498 10/2001
(Continued)

OTHER PUBLICATIONS

International Search Report of the International Searching Authority for International Application PCT/EP2012/053492, mailed Sep. 25, 2012, 3 pages, European Patent Office, HV Rijswijk, Netherlands.
(Continued)

*Primary Examiner* — Gertrude Arthur Jeanglaud
(74) *Attorney, Agent, or Firm* — W. F. Fasse (57) ABSTRACT

A method and a device are for prediction and adaptation of movement trajectories of a vehicle for assisting the driver and/or for preventing or reducing the severity of a collision. Situatively required movement trajectories for assisting the driver or collision avoidance are determined using an environment sensor system. Physically possible movement trajectories are determined from characteristic properties of the driving dynamics of the vehicle and from the coefficient of friction between the tires and the road up to a maximum coefficient of friction. An intersection between the above two sets of trajectories is determined, and only trajectories that are included in this intersection are taken into account for the prediction and adaptation of movement trajectories for the driving assistance or collision avoidance function.

20 Claims, 4 Drawing Sheets

(51) Int. Cl.
| | |
|---|---|
| *B60T 1/10* | (2006.01) |
| *B60T 8/1755* | (2006.01) |
| *B60W 10/184* | (2012.01) |
| *B60W 10/20* | (2006.01) |
| *B60W 30/09* | (2012.01) |
| *B60W 30/095* | (2012.01) |
| *B62D 6/00* | (2006.01) |
| *B62D 15/02* | (2006.01) |
| *G08G 1/16* | (2006.01) |

(52) U.S. Cl.
CPC ............ *B60W 10/184* (2013.01); *B60W 10/20* (2013.01); *B60W 30/09* (2013.01); *B60W 30/0953* (2013.01); *B62D 6/002* (2013.01); *B62D 6/006* (2013.01); *B62D 15/028* (2013.01); *B62D 15/0265* (2013.01); *B62D 15/0275* (2013.01); *G08G 1/165* (2013.01); *G08G 1/166* (2013.01); *G08G 1/167* (2013.01); *B60T 2210/32* (2013.01); *B60W 2550/12* (2013.01); *B60W 2550/148* (2013.01); *B60W 2550/408* (2013.01)

(56) References Cited

U.S. PATENT DOCUMENTS

| | | | |
|---|---|---|---|
| 6,017,101 A | 1/2000 | Matsuda | |
| 6,272,418 B1 | 8/2001 | Shinmura et al. | |
| 6,289,281 B1 | 9/2001 | Shinmura et al. | |
| 6,292,753 B1 | 9/2001 | Sugimoto et al. | |
| 6,567,748 B2 | 5/2003 | Matsuno | |
| 6,567,749 B2 | 5/2003 | Matsuura | |
| 6,820,007 B2 | 11/2004 | Abe et al. | |
| 6,926,374 B2 | 8/2005 | Dudeck et al. | |
| 6,959,970 B2 | 11/2005 | Tseng | |
| 6,962,396 B2 | 11/2005 | Faye et al. | |
| 6,968,920 B2 | 11/2005 | Barton et al. | |
| 7,015,805 B2 | 3/2006 | Knoop et al. | |
| 7,035,735 B2 | 4/2006 | Knoop et al. | |
| 7,213,687 B2 | 5/2007 | Sakai et al. | |
| 7,729,841 B2 | 6/2010 | Knoop et al. | |
| 7,734,418 B2 | 6/2010 | Shoda et al. | |
| 7,739,008 B2 | 6/2010 | Cieler et al. | |
| 7,778,753 B2 | 8/2010 | Fujiwara et al. | |
| 8,086,406 B2 | 12/2011 | Ewerhart et al. | |
| 8,126,626 B2 | 2/2012 | Zagorski | |
| 8,146,703 B2 | 4/2012 | Baumann et al. | |
| 8,255,121 B2 | 8/2012 | Zagorski et al. | |
| 8,392,062 B2 | 3/2013 | Oechsle et al. | |
| 8,423,277 B2 | 4/2013 | Shirato | |
| 8,452,506 B2 | 5/2013 | Groult | |
| 8,538,674 B2 | 9/2013 | Breuer et al. | |
| 2001/0039472 A1 | 11/2001 | Isogai et al. | |
| 2004/0030497 A1 | 2/2004 | Knoop et al. | |
| 2004/0030498 A1 | 2/2004 | Knoop et al. | |
| 2004/0090117 A1 | 5/2004 | Dudeck et al. | |
| 2004/0158377 A1 | 8/2004 | Matsumoto et al. | |
| 2004/0193374 A1 | 9/2004 | Hac et al. | |
| 2005/0004738 A1 | 1/2005 | Gronau et al. | |
| 2005/0267683 A1 | 12/2005 | Fujiwara et al. | |
| 2006/0100766 A1 | 5/2006 | Schwarz et al. | |
| 2006/0163943 A1 | 7/2006 | Von Holt et al. | |
| 2006/0195231 A1 | 8/2006 | Diebold et al. | |
| 2007/0052530 A1 | 3/2007 | Diebold et al. | |
| 2007/0129891 A1 | 6/2007 | Yano et al. | |
| 2007/0294019 A1 | 12/2007 | Nishira et al. | |
| 2007/0299610 A1 | 12/2007 | Ewerhart et al. | |
| 2008/0046145 A1 | 2/2008 | Weaver et al. | |
| 2008/0208408 A1 | 8/2008 | Arbitmann et al. | |
| 2008/0319610 A1 | 12/2008 | Oechsle et al. | |
| 2009/0212930 A1 | 8/2009 | Pfeiffer et al. | |
| 2009/0222166 A1 | 9/2009 | Arbitmann et al. | |
| 2009/0234543 A1 | 9/2009 | Groitzsch et al. | |
| 2010/0211235 A1 | 8/2010 | Taguchi et al. | |
| 2011/0015818 A1 | 1/2011 | Breuer et al. | |
| 2011/0082623 A1 | 4/2011 | Lu et al. | |
| 2011/0190961 A1 | 8/2011 | Giebel et al. | |
| 2011/0196576 A1 | 8/2011 | Staehlin | |
| 2012/0065861 A1 | 3/2012 | Hartmann et al. | |
| 2013/0338878 A1 | 12/2013 | Fritz et al. | |
| 2014/0005875 A1 | 1/2014 | Hartmann et al. | |

FOREIGN PATENT DOCUMENTS

| | | | |
|---|---|---|---|
| DE | 100 36 276 | | 2/2002 |
| DE | 103 16 413 | | 10/2004 |
| DE | 103 34 203 | | 3/2005 |
| DE | 102005002760 | | 8/2005 |
| DE | 102004060053 | | 12/2005 |
| DE | 102005031854 | | 2/2006 |
| DE | 102004056120 | | 5/2006 |
| DE | 102004059002 | | 6/2006 |
| DE | 102005003177 | | 7/2006 |
| DE | 102005003274 | | 7/2006 |
| DE | 102005035624 | | 2/2007 |
| DE | 102005037479 | | 2/2007 |
| DE | 102006036921 | | 4/2007 |
| DE | 102005062275 | | 6/2007 |
| DE | 102006057744 | | 7/2008 |
| DE | 102008040241 | * | 1/2010 |
| DE | 102009020649 | * | 11/2010 |
| DE | 102010028384 | | 11/2010 |
| EP | WO0208010 | * | 1/2002 |
| EP | 1 600 321 | | 11/2005 |
| EP | 1 977 946 | | 10/2008 |
| JP | 2007-022232 A | | 2/2007 |
| WO | WO 02/08010 | | 1/2002 |
| WO | WO 03/006288 | | 1/2003 |
| WO | WO 2004/103798 | | 12/2004 |
| WO | WO 2006/045826 | | 5/2006 |
| WO | WO 2010/028629 | | 3/2010 |

OTHER PUBLICATIONS

PCT International Preliminary Report on Patentability including English Translation of PCT Written Opinion of the International Searching Authority for International Application PCT/EP2012/053492, issued Sep. 3, 2013, 9 pages, International Bureau of WIPO, Geneva, Switzerland.

German Search Report for German Application No. 10 2012 203 187.1, dated Oct. 1, 2012, 5 pages, Muenchen, Germany, with English translation, 5 pages.

* cited by examiner

METHOD AND DEVICE FOR THE PREDICTION AND ADAPTATION OF MOVEMENT TRAJECTORIES OF MOTOR VEHICLES

FIELD OF THE INVENTION

The present invention relates to a method for the prediction and adaptation of movement trajectories of a motor vehicle for assisting the driver in his or her task of driving and/or for preventing a collision or reducing the consequences of an accident. The present invention further relates to a device for carrying out the method.

BACKGROUND INFORMATION

Such a method and device are known from WO 03/006288 A1. The known method for the prediction of the movement trajectories of a vehicle is used for preventing or reducing the consequences of an accident. The method is thus exclusively applied in emergency situations. This method for the prediction of movement trajectories only takes into account those movement trajectories in which as a result of a combination of a steering and braking intervention, the forces exerted on the wheels of the vehicle lie in a range corresponding to the maximum force that can be transferred from the wheel to the road. This is the stability limit when utilizing the maximum coefficient of friction. An automatic braking and/or steering intervention takes place based on the movement trajectories that have been calculated in advance.

A method for controlling the directional stability of a vehicle and for avoiding collision with an object located in the traffic lane is known from DE 10 2010 028 384 A1. This known method determines based on environmental signals if a critical situation with respect to driving dynamics exists or if a collision is imminent. The method is thus exclusively applied in emergency situations.

SUMMARY OF THE INVENTION

It is therefore an object of at least one embodiment of this invention to improve a method of the type mentioned above such that steps are taken before emergency situations arise which will in a potential emergency situation result in a faster response to support the driver in his or her driving job and/or to prevent a collision or reduce the consequences of an accident.

This object can be achieved by at least one embodiment of a method and device having the features of the invention set forth herein. An embodiment of this method involves that for the prediction and adaptation of movement trajectories of a motor vehicle, an intersection of situatively required movement trajectories, which are determined using environment sensors, and physically possible movement trajectories, which result from properties that are characteristic of the driving dynamics of the motor vehicle and from the coefficient of friction obtained between the tires and the road up to a maximum possible threshold coefficient of friction, is formed, and only those movement trajectories are taken into account that lie within this intersection. In this way, it is ensured that only movement trajectories are taken into account which, on the basis of the forces exerted on the wheels and resulting from the calculated movement trajectories by combining braking forces and/or steering forces, lie below the maximum possible threshold coefficient of friction.

In an advantageous development of the method, only one movement trajectory from the intersection is taken into account depending on the criticality of the driving situation. The higher the criticality of the emergency situation, the higher is the utilization of the maximum available coefficient of friction as a result of braking and/or steering interventions in accordance with the calculated movement trajectory. The environment sensors are used to determine a target corridor with a tolerance margin that is situatively required and physically possible.

The situatively required movement trajectories are determined based on the available avoidance space, and the physically possible movement trajectories are limited by the driving physics.

In an alternative embodiment, the predicted movement trajectory is constantly monitored during the driving maneuver and, if required, adjusted to a dynamically changing driving situation or discarded and newly predicted.

Braking and/or steering interventions are preferably performed depending on the calculated movement trajectory and aimed at supporting the driver, correcting driver input, or automated interventions in the braking and/or steering system. The wheel forces resulting from the movement trajectories through combined braking and/or steering interventions are at any time below the maximum available coefficient of friction. The maximum possible coefficient of friction will be used by additional signals from optical road sensors, such as laser and/or camera systems, and/or vehicle dynamics control systems such as driving stability control systems or traction slip control systems and/or other sensors such as rain, temperature, or tire sensors and/or by including information transmitted via car-to-x communication. Tire sensors are, for example, tire pressure sensors. Then the maximum possible coefficient of friction is tested for plausibility by the signals of the sensors that were not used for its determination. For this purpose, the maximum possible coefficient of friction may be logically limited to specific predetermined values.

In an alternative to the method according to the invention, only a finite number of movement trajectories for supporting the driver is determined in advance and stored. In an emergency situation, the movement trajectory that comes closest to the current driving situation is selected from the predefined movement trajectories. When a critical driving situation is detected, a suitable movement trajectory is selected and a sequence number of the movement trajectory is transmitted to the control unit. The executing control unit withdraws the movement trajectory that matches the sequence number from the memory and executes it accordingly. The advantage of this method is that not the entire avoidance space available but just the predefined movement trajectories are taken into account to generate a movement trajectory. This measure saves calculating power, and the decision in favor of a specific movement trajectory can be made in a shorter time.

In a particularly advantageous development of the method according to the invention, a movement trajectory is found optimal if it is within the intersection and has a minimum curvature. This measure ensures that the selected movement trajectory keeps the greatest possible distance to physical limits and at the same time guides the vehicle safely past the object.

The above object can also be achieved by at least one embodiment of a device according to the invention having the features set forth herein. Means for the prediction and adaptation of movement trajectories of a motor vehicle are provided that form an intersection of situatively required movement trajectories, which are determined using environment sensors, and physically possible movement trajectories, which result from properties that are characteristic of the driving dynamics of the motor vehicle and from the coefficient of friction obtained between the tires and the road up to a maximum possible threshold coefficient of friction, and only those movement trajectories are taken into account that lie within this intersection.

In an advantageous development, the environment sensors comprise a radar sensor, a lidar sensor, a camera system, or a combination of these sensors.

Furthermore, a memory is provided in which a predetermined finite number of movement trajectories for supporting the driver in all driving situations is stored. The movement trajectories to be executed are stored under a sequence number in the executing control unit.

BRIEF DESCRIPTION OF THE DRAWINGS

The invention will be explained in more detail below, with reference to an embodiment and the enclosed figure. Wherein.

DETAILED DESCRIPTION OF EXAMPLE EMBODIMENTS OF THE INVENTION

The term "steering wheel" in the meaning of this invention represents all conceivable man-machine interfaces that a driver can operate for steering and driving the motor vehicle, such as a joystick or a touch pad.

Figure 1:
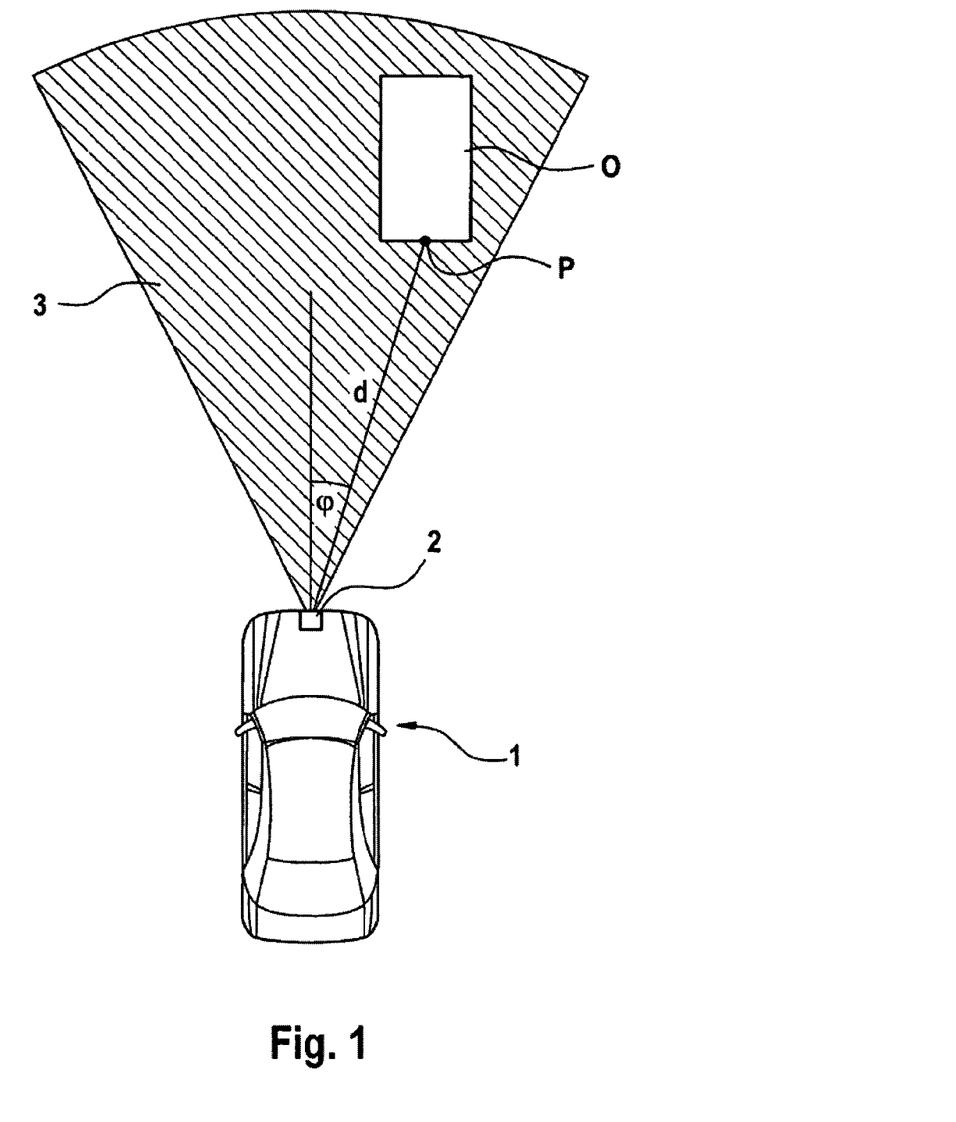
FIG. 1 shows a schematic of a vehicle with environment sensors for detecting objects in the environment of the vehicle.

FIG. 1 shows an example of a four-wheel, two-axle vehicle 1 that has environment sensors 2 with which objects O in the environment of the vehicle can be detected, which in particular are other vehicles in the same or a neighboring traffic lane to side from, and/or in front of, the vehicle. Objects O can also be static or almost static objects such as trees, pedestrians, or roadside borders. An example of environment sensors 2 is shown with a detection range 3 that captures a solid angle in front of the vehicle 1 in which an exemplary object O is shown. The environment sensors 2 may, for example, comprise a LIDAR (Light Detection and Ranging) sensor that is generally known to a person skilled in the art. Other types of environment sensors such as radar sensors or optical camera systems or a combination of the aforementioned environment sensors can be used. Furthermore, the information about the environment can be detected using so-called car-to-x communication. This means transmission of environmental information from other vehicles or detection points to the vehicle 1. The environment sensors 2 measure the distances d to the detected points of an object and the angles φ between the connecting lines to these points and the central longitudinal axis of the vehicle, as shown by way of example in FIG. 1 for a point P of the object O. The fronts of the detected objects that face towards the vehicle are composed of multiple acquired points, for which sensor signals are transmitted that establish correlations between points and the shape of an object and determine a reference point for the object O. For example, the center of the object O or the center of the acquired points of the object can be selected as the reference point. Unlike a radar sensor (Doppler effect), a LIDAR environment sensor 2 cannot directly measure the speeds of the detected points and therefore the speed of the detected objects. They are calculated from the difference between the distances measured at subsequent time steps in a cyclically operating object recognition unit 21. Acceleration of the objects can in principle be determined in a similar way by deriving their positions two times.

Figure 2:
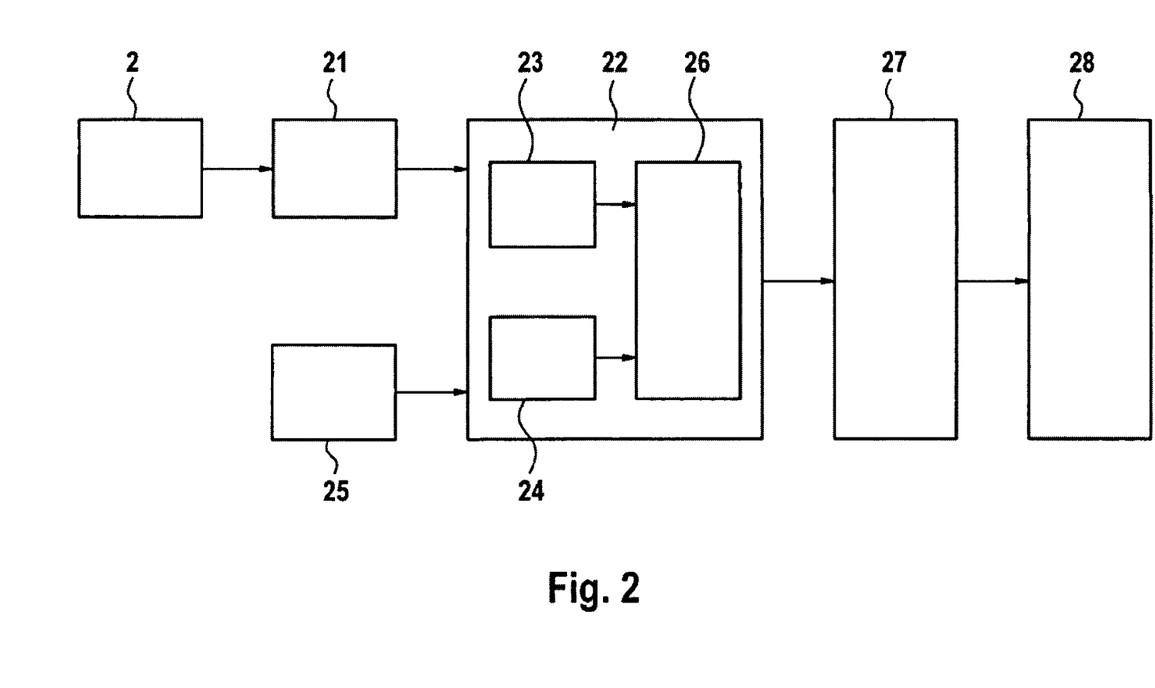
FIG. 2 shows a schematic of a driver assistance system.

FIG. 2 shows a diagram of a driver assistance system whose components, except for sensors and actuators, are preferably made up of software modules that are executed using a microprocessor inside the vehicle 1. As shown in FIG. 2, object data in the form of electronic signals is transmitted to a decision means 22 within the block diagram of the driver assistance system. The decision means 22 determines an object trajectory based on the information about the object O in block 23. In addition, it determines a movement trajectory T of the vehicle 1 in block 24 based on information about the dynamic status of the vehicle 1 that can be obtained using other vehicle sensors 25. Information used particularly includes the vehicle speed that can be determined using wheel speed sensors, the steering angle δ measured using a steering angle sensor on the steerable wheels of the vehicle 1, the yaw rate and/or lateral acceleration of the vehicle 1 that are measured using respective sensors. It is further possible to calculate or estimate model-based variables from the dynamic vehicle states measured using the vehicle sensors 25. Information about the coefficient of friction between the tires of the vehicle 1 and the road is also obtained from the vehicle sensors. The coefficient of friction μ is in particular determined from the brake control system. The decision means 22 then checks in block 26 if the motor vehicle 1 is on a collision course with one of the detected objects O. If such a collision course is found and the collision time, i.e. the time before the detected collision with the object O will occur, which is also determined by the decision means, falls below a specific value, a trigger signal is sent to a path control means 27. The trigger signal initially triggers the calculation of an evasive path, i.e. a movement trajectory T, in the path control means. Then a starting point for the evasive maneuver is determined based on the evasive paths or set of movement trajectories determined, which is the point at which the evasive maneuver must be started to be able to just avoid the object O. These steps are preferably repeated in time increments until there is no more collision risk due to course changes of the object O or the vehicle 1 or until the vehicle 1 reaches the starting point for an evasion maneuver. If this is the case, the evasive path or parameters representing this path are sent to a steering actuator control means 28.

Figure 3:
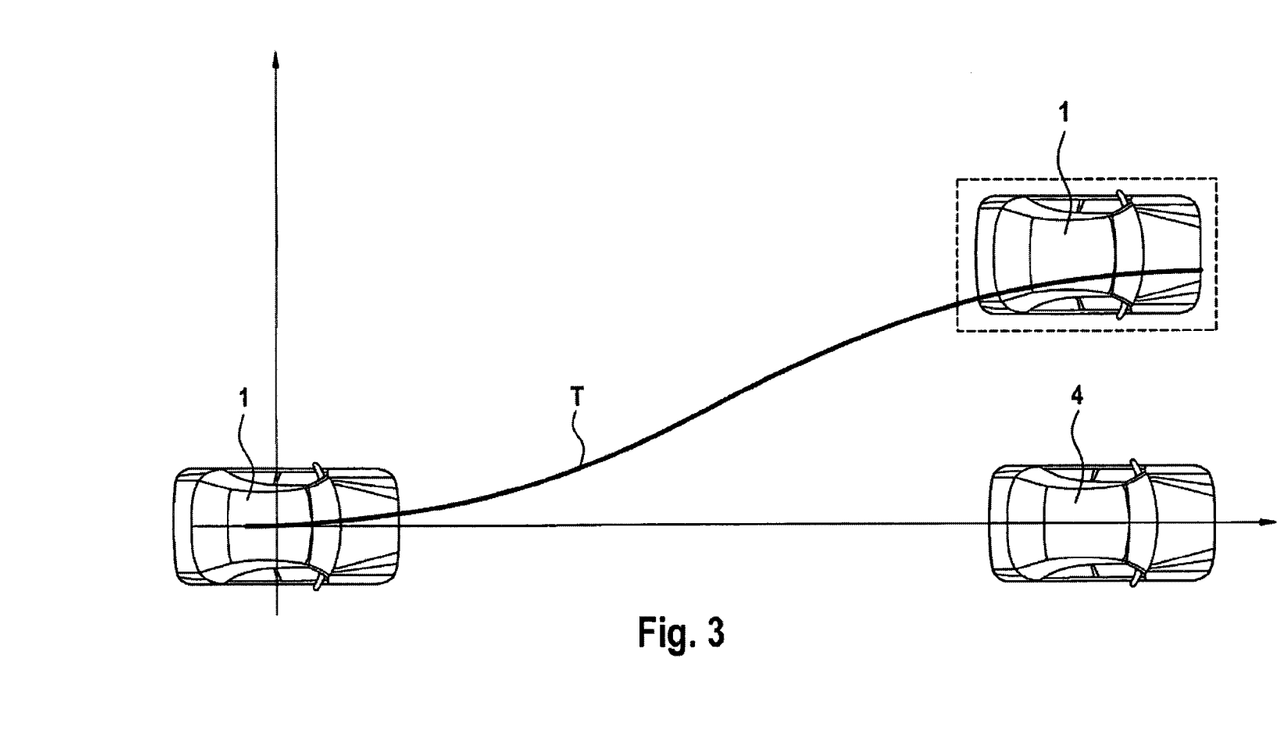
FIG. 3 shows a schematic of an optimum movement trajectory.
Figure 4:
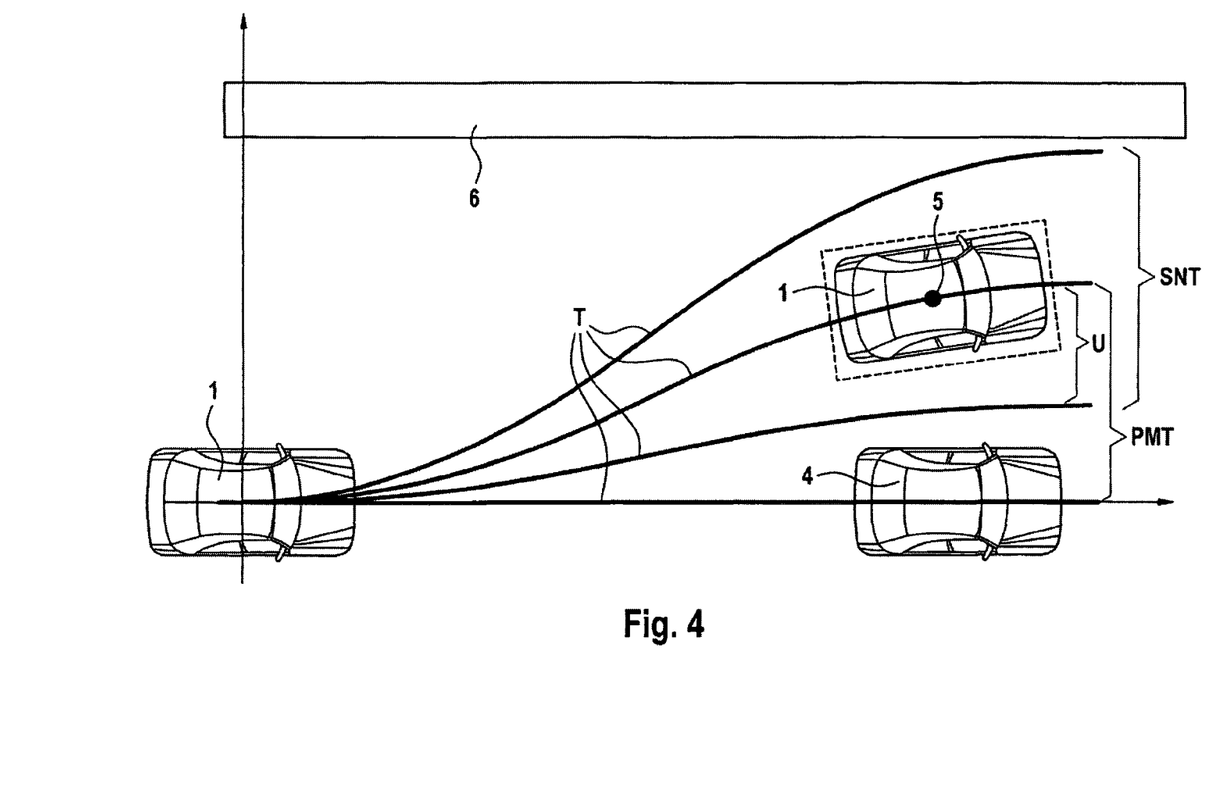
FIG. 4 shows a schematic of the intersection of situatively required and physically possible movement trajectories.

In FIGS. 3 and 4, the x-axis represents the longitudinal distance to the object O and the y-axis shows the lateral evasion distance. FIG. 3 shows an optimum movement trajectory T. The vehicle 1 bypasses an obstacle shown in FIG. 3 as another vehicle 4 by following the optimum movement trajectory T. FIG. 4 shows an additional road boundary 6. The set of movement trajectories T is an array of curves. The method for the prediction and adaptation of movement trajectories of a vehicle 1 is used to assist the driver in his or her task of driving and/or to prevent a collision or reduce the consequences of an accident. The situatively required movement trajectories SNT are compared to the physically possible movement trajectories PMT that depend on the vehicle and on the coefficient of friction between the tires and the road, and initially an intersection U is generated from both groups as a set of solutions. Those movement trajectories T of the set of solutions that correspond to the criticality of the driving situation are taken into account. Support of the driver in his or her driving task is provided based on the calculated movement trajectory T in the form of braking and/or steering interventions and ranges from supporting the driver to correcting the driver input to completely automated or autonomous, driver-independent interventions.

FIG. 4 shows multiple movement trajectories T, each of which representing a center-of-gravity trajectory of the vehicle 1. The center of gravity 5 of the vehicle moves along one of the movement trajectories T. As shown on the right margin of FIG. 4, the physically possible trajectories PMT indicate driving straight ahead until the limit of vehicle dynamics is reached. The situatively required movement trajectories SNT rule out driving straight ahead because this would result in a collision. The situatively required trajectory SNT with the least curvature leads just past the obstacle, the motor vehicle 4. The intersection U of the situatively required movement trajectories SNT and the physically possible movement trajectories PMT is formed. Only movement trajectories T that are within the intersection qualify as evasive path for the vehicle 1.

An intersection U can only be formed if the situatively required movement trajectories SNT and the physically possible movement trajectories PMT overlap, and only in this case is a recommended evasive path, evasion support, or an autonomous intervention possible and useful. The presence of an intersection U thus is a prerequisite for executing a subsequent evasion recommendation, supporting the driver, or performing an autonomous intervention. The first condition are the situatively required movement trajectories SNT. This means that an object O like the vehicle 4 shown in FIG. 3 must be in the direction of movement of one's own vehicle 1 and on a collision course with it. Furthermore, there must be sufficient avoidance space for a situatively required movement trajectory such that the own vehicle 1 can avoid the second vehicle 4. The environment sensors 2 determine a target corridor with a situatively possible tolerance range for this purpose. The second condition are the physically possible movement trajectories PMT. A movement trajectory T is physically possible if the driving physics does not preclude the movement trajectory T. The physical driving properties up to a maximum threshold coefficient of friction $\mu_{max}$ are calculated from the dynamic properties of the motor vehicle 1 and the coefficient of friction $\mu$ between the tires and the road. Vehicle dynamic factors that constitute physical constraints for a movement trajectory T particularly include lateral dynamic variables, such as the maximum permissible lateral acceleration, maximum permissible yaw rate, maximum permissible lateral speed, and the maximum permissible yaw angle or the potential coefficient of friction $\mu$ between the vehicle tires and the surface of the road. The utilization of the maximum available coefficient of friction $\mu$ depends on the criticality of the situation: The higher the criticality, the greater the utilization of the coefficient of friction $\mu$. The predominant goal is to avoid collision or reduce the consequences of an accident. In the normal driving range where the criticality of the driving situation is below a limit, movement trajectories T can be predicted and adapted based on a predetermined driver profile and/or type of driver/driver behavior. The wheel forces that result from combined braking and/or steering interventions based on the calculated movement trajectories T must be below the maximum possible coefficient of friction $\mu_{max}$ at all times. The maximum possible coefficient of friction $\mu_{max}$ is determined from additional signals from optical road sensors and/or from vehicle dynamics control systems and/or from other sensors such as rain, temperature, or tire sensors. Those additional signals that are not used to determine the maximum available coefficient of friction $\mu_{max}$ are used to test the plausibility of the coefficient of friction $\mu_{max}$ determined. The maximum possible coefficient of friction $\mu_{max}$ is logically limited to specific predetermined values. For example, the maximum possible coefficient of friction $\mu_{max}$ can be set to 0.5 when snow is detected. If the road is wet, it is assumed that the maximum possible coefficient of friction $\mu_{max}$ is smaller than 0.7 or 0.8.

The intersection U of the situatively required and physically possible movement trajectories SNT, PMT represents the set of solutions, and only those movement trajectories T that are within the intersection are taken into account.

When determining a movement trajectory T or a set of movement trajectories T, the predicted movement trajectory T is constantly monitored during the driving maneuver and, if required, adapted to a dynamically changing driving situation. If this is not possible, the movement trajectory T is discarded and newly predicted.

Alternatively, a finite number Z of movement trajectories T for supporting the driver in all driving situations is determined in advance and stored. In an emergency situation, the movement trajectory T that comes closest to the current driving situation is selected from the predefined movement trajectories T. When a critical driving situation is detected, a suitable movement trajectory T is selected and a sequence number of the movement trajectory is transmitted to the control unit. The executing control unit withdraws the movement trajectory T that matches the sequence number from the memory and executes it accordingly. The advantage of this method is that not the entire avoidance space available but just the predefined movement trajectories T are taken into account to generate a movement trajectory T. This measure saves calculating power, and the decision in favor of a specific movement trajectory can be made in a shorter time.

Rather than determining the movement trajectory of the evasive path from the indefinite space of potential parameters, a finite number Z of movement trajectories T is determined in advance and stored in a storage medium. These stored movement trajectories T cover all situations in which the system is meant to provide support. If an intervention becomes necessary, it is only determined which of the movement trajectories T fit best to the current situation, and this movement trajectory T is then used.

The courses of the movement trajectories T are stored on another control unit than the control unit that makes the decision and selects the movement trajectory T. In the embodiment described with reference to FIG. 2, the course of movement trajectory T is stored in the steering actuator control means 28 while the decision of using a movement trajectory T and its selection are performed in the decision means 22. The decision means just transmits the sequence number of the movement trajectory to be used. The movement trajectories are stored as sets of points or sets of parameters for a movement trajectory model in the steering actuator control means 28. The restriction to a fixed number Z of movement trajectories T makes it easier to check them for feasibility and to ensure that the vehicle can be controlled based on these movement trajectories T.

A movement trajectory T is considered optimal if it is within the intersection U of situatively required movement trajectories SNT and physically possible movement trajectories PMT and comprises a minimum curvature. The condition of minimum curvature ensures the greatest possible distance from the limits of driving physics. This means that a safety distance to the limits of driving physics is kept and the vehicle is still guided to avoid an accident. The minimum curvature of the movement trajectory T maintains a comfortable driving feel for the driver.

The method can in general be applied to other objects than one's own motor vehicle, for example, to movement trajectories of objects O that were detected by the environment sensors 2.

The invention claimed is:

1. A method for prediction and adaptation of movement trajectories T of a motor vehicle driving on a road for assisting an driver in his or her task of driving and/or for preventing a collision or reducing consequences of an accident, characterized in that for the prediction and adaptation of movement trajectories (T) of the motor vehicle (1), an intersection (U) of situatively required movement trajectories (SNT), which are determined using environment sensors (2), and physically possible movement trajectories (PMT), which result from properties that are characteristic of driving dynamics of the motor vehicle (1) and from a coefficient of friction ($\mu$) obtained between tires and the road up to a maximum possible threshold coefficient of friction ($\mu_{max}$), is formed, and only those movement trajectories (T) are taken into account that lie within the intersection (U).

2. The method according to claim 1, characterized in that only one movement trajectory (T) from the intersection (U) is taken into account depending on a criticality of a driving situation.

3. The method according to claim 1, characterized in that the situatively required movement trajectories (SNT) are determined based on an avoidance space available and the physically possible movement trajectories (PMT) are limited by a driving physics.

4. The method according to claim 1, characterized in that the environment sensors (2) are used to determine a target corridor with a situatively required and physically possible tolerance margin.

5. The method according to claim 1, characterized in that the predicted movement trajectories (T) are constantly monitored during a driving maneuver and, if required, adjusted to a dynamically changing driving situation or discarded and newly predicted.

6. The method according to claim 1, characterized in that braking and/or steering interventions are performed depending on calculated movement trajectories (T) with a purpose of supporting the driver, correcting a driver input, or automated interventions in the braking and/or steering system.

7. The method according to claim 1, characterized in that wheel forces resulting from combined braking and/or steering interventions based on the movement trajectories (T) are always below the maximum available coefficient of friction ($\mu_{max}$).

8. The method according to claim 1, characterized in that the maximum possible coefficient of friction ($\mu_{max}$) is determined using additional signals from optical road sensors and/or from vehicle dynamics control systems and/or from other sensors such as rain, temperature, or tire sensors and/or by including information transmitted via car-to-x communication.

9. The method according to claim 8, characterized in that the maximum possible coefficient of friction ($\mu_{max}$) is tested for plausibility using the signals from the sensors that were not used for its determination.

10. The method according to claim 8, characterized in that the maximum possible coefficient of friction ($\mu_{max}$) is logically limited to predetermined values.

11. The method according to claim 1, characterized in that a finite number (Z) of movement trajectories (T) for supporting the driver in all driving situations is determined in advance and stored.

12. The method according to claim 11, characterized in that the movement trajectory (T) that comes closest to a current driving situation is selected from predefined movement trajectories (T).

13. The method according to claim 11, characterized in that upon detection of a critical driving situation, a suitable movement trajectory (T) is selected and a sequence number of the movement trajectory (T) is transmitted to the executing control unit.

14. The method according to claim 1, characterized in that a movement trajectory (T) is found optimal if it is within the intersection (U) and has a minimum curvature.

15. A device for prediction and adaptation of movement trajectories (T) of a motor vehicle driving on a road (1), characterized in that means for the prediction and adaptation of movement trajectories (T) of the motor vehicle (1) are provided that establish an intersection (U) of situatively required movement trajectories (T), which are determined using environment sensors (2), and physically possible movement trajectories (T), which result from properties that are characteristic of driving dynamics of the motor vehicle (1) and from a coefficient of friction ($\mu$) obtained between tires and the road up to a maximum possible threshold coefficient of friction ($\mu_{max}$), and take into account only those movement trajectories (T) that lie within the intersection (U).

16. The device according to claim 15, characterized in that the environment sensors (2) comprise a radar sensor, a lidar sensor, a camera system, or a combination of these sensors.

17. The device according to claim 15, characterized in that a memory is provided in which a predetermined, finite number (Z) of movement trajectories (T) for supporting the driver in all driving situations is stored.

18. The device according to claim 15, characterized in that the movement trajectory (T) is stored under a sequence number in the executing control unit.

19. A method of assisting a driver in driving a vehicle, preventing a collision of the vehicle, and/or reducing a severity of a collision of the vehicle, comprising steps:
   a) using environment sensors of the vehicle, detecting environment data regarding a driving situation of the vehicle in a driving environment of the vehicle;
   b) based on the environment data, determining situatively required movement trajectories of the vehicle, which are required for assisting the driver, preventing a collision of the vehicle, and/or reducing a severity of a collision of the vehicle in the driving situation;
   c) obtaining vehicle property values that are characteristic of driving dynamics of the vehicle;
   d) determining a coefficient of friction between tires of the vehicle and a road on which the vehicle is driving, up to a maximum threshold coefficient of friction;
   e) based on the vehicle property values and the coefficient of friction, determining physically possible movement trajectories of the vehicle, which are physically possible for the vehicle to carry out;
   f) forming an intersection of the situatively required movement trajectories and the physically possible movement trajectories to determine an intersection set of trajectories that are both situatively required and physically possible;
   g) selecting a selected trajectory from the intersection set of trajectories; and
   h) executing a driving assistance function to maneuver the vehicle along or toward the selected trajectory, for assisting the driver in driving the vehicle, for preventing a collision of the vehicle, and/or for reducing a severity of a collision of the vehicle.

20. The method according to claim 19, performed continuously during a driving maneuver and not only when an emergency collision-avoidance situation arises.

* * * * *